United States Patent [19]
Marui

[11] Patent Number: 5,408,900
[45] Date of Patent: Apr. 25, 1995

[54] BICYCLE HANDLE

[75] Inventor: Kohei Marui, Kobe, Japan

[73] Assignee: Marui Co., Ltd., Kobe, Japan

[21] Appl. No.: 14,456

[22] Filed: Feb. 3, 1993

[30] Foreign Application Priority Data

Feb. 5, 1992 [JP] Japan .................. 4-020270
Jun. 17, 1992 [JP] Japan .................. 4-158047

[51] Int. Cl.⁶ .............................. B62K 21/12
[52] U.S. Cl. ................... 74/551.4; 74/551.3; 74/551.1; 403/344
[58] Field of Search ............ 74/551.1–551.8; 280/279; 403/192, 344

[56] References Cited

U.S. PATENT DOCUMENTS

| | | | |
|---|---|---|---|
| 575,936 | 1/1897 | Roso | 74/551.3 |
| 1,932,251 | 10/1933 | Nauts | 74/551.3 |
| 2,041,704 | 5/1936 | Gordon et al. | 74/551.3 |
| 2,366,061 | 12/1944 | Schwinn | 74/551.3 |
| 3,481,218 | 12/1969 | Yoshikawa | 74/551.3 |
| 3,655,219 | 4/1972 | Jacoby | 74/551.6 |
| 4,729,255 | 3/1988 | Moulton | 74/551.4 |
| 4,903,627 | 2/1990 | Nakamura | 74/551.3 X |
| 5,144,859 | 9/1992 | Malone | 74/551.3 |
| 5,224,396 | 7/1993 | Lobbezoo et al. | 74/551.1 X |

FOREIGN PATENT DOCUMENTS

| | | | |
|---|---|---|---|
| 0072688 | 2/1983 | European Pat. Off. | 74/551.3 |
| 918855 | 10/1954 | Germany | 74/551.4 |
| 1236359 | 3/1967 | Germany | 74/551.3 |
| 728898 | 12/1966 | Italy | 74/551.4 |
| 47-20484 | 6/1972 | Japan . | |
| 47-20485 | 6/1972 | Japan . | |
| 52-93035 | 8/1977 | Japan . | |
| 59-89282 | 5/1984 | Japan . | |
| 1-96394 | 6/1989 | Japan . | |
| 578359 | 6/1946 | United Kingdom | 74/551.3 |
| 1571841 | 7/1980 | United Kingdom | 74/551.3 |

Primary Examiner—Vinh T. Luong
Attorney, Agent, or Firm—Steven M. Rabin

[57] ABSTRACT

A bicycle handle consists of a horizontal bar-binding cylinder provided on a handle stem, a pair of handle bars fixed in both ends of the bar-binding cylinder and one or two pressure cylinders holding the handle bars. A through hole perforated in the pressure cylinder inclines from an axis of the bar-binding cylinder. Each handle bar has a handle grip at an end of it. The handle bars are inserted into the pressure cylinder. When the pressure cylinder alone rotates, since a slanting direction of the through hole is changed, an projecting angle of the handle bar inserted into the through hole from the bar-binding cylinder is changed. So a position of the handle grip can be changed easier.

5 Claims, 5 Drawing Sheets

PRIOR ART

BICYCLE HANDLE

FIELD OF THE INVENTION

This invention relates to a bicycle handle. In particular, the invention relates to a bicycle handle wherein a pair of handle bars are inserted and fixed into both ends of a horizontal bar-binding cylinder provided on a handle stem.

BACKGROUND OF THE INVENTION

In general, a construction of a bicycle handle is divided into two types, a type wherein a handle bar and a handle stem are united and a type wherein they are not. And as the handle bar, there also are two types, a type wherein a right handle bar and a left handle bar are united and a type wherein they are not.

As shown in FIG. 11, in the type of handle bar separated into a right bar and a left bar, one end of each handle bar (1) is an insertion end to be inserted into a corresponding end of a horizontal bar-binding cylinder (10) of a handle stem (13), the other end of the handle bar (1) having a handle grip (5). The bar-binding cylinder (10) is tightened by bolts (19,19) so that the handle bars (1,1) will not rotate in the bar-binding cylinder (10).

When the bolts (19,19) are loosened, the handle bars (1,1) can rotate in the bar-binding cylinder (10). Thereby, it is possible to change positions of the handle grips (5,5) depending on the most suitable posture of the handle bars for a rider.

In the above mentioned bicycle handle, however, since the handle bars themselves rotate in the bar-binding cylinder (10), as shown in two-dot chain line in FIG. 11, brake levers (12,12) provided forward of the handle grips (5,5) rotate together with the handle bars (1,1). Accordingly, in the above-mentioned bicycle handle, when the positions of the handle grips (5,5) are changed, the positions of the brake levers (12,12) must be adjusted. And the adjustment of the brake levers (12,12) makes changing the positions of the handle grips (5,5) very difficult.

Besides, it is impossible to change the positions of the handle grips (5,5) in a handle bar constructed as a straight body.

An object of this invention is to provide a bicycle handle having handle grips, and break levers, wherein the positions of the handle grips can be changed easily. Another object of this invention is to provide a bicycle handle having handle grips and brake levers, wherein the positions of the handle grips can be changed, even if the handle bar is a straight member.

SUMMARY OF THE INVENTION

The bicycle handle according to the first invention comprises a bar-binding cylinder (10) provided on a handle stem, a pair of handle bars (1,1) inserted and fixed into both ends of the bar-binding cylinder (10), a handle grip (5) formed on one end of each handle bar (1), a pressure cylinder (2) inserted into the bar-binding cylinder (10), a through hole (20) in the pressure cylinder (2) and bent at the center (midpoint) of it symmetrically, a diameter of the through hole (20) being a little larger at the midpoint than at an insertion end of the handle bar (1) and a tightening means (8) for tightening the bar-binding cylinder (10) in a radial direction.

The function of the bicycle handle of the invention will now be explained. The pressure cylinder (2) is inserted into the bar-binding cylinder (10) and the insertion ends of the handle bars (1,1) are inserted into both ends of the through hole (20) of the pressure cylinder (2). Thereafter, the bar-binding cylinder (10) is tightened in the radial direction by the tightening means (8). Thereby, since an inner surface of the bar-binding cylinder (10) presses against an outer surface of the pressure cylinder (2), the diameter of the through hole (20) becomes smaller by the pressing force of the bar-binding cylinder (10). The insertion end of the handle bar (1) then receives pressure from a cylindrical wall of the pressure cylinder (2). Thereby, the bar-binding cylinder (10), the pressure cylinder (2) and the handle bars (1,1) are fixed by a frictional force caused by the above mentioned pressing forces.

In the meantime, the through hole (20) bends at the center of the pressure cylinder (2) symmetrically. In other words, the through hole (20) consists of a pair of symmetric slanting holes. When the insertion ends of the handle bars (1,1) are inserted into both ends of the through hole (20) of the pressure cylinder (2), the handle bars (1,1) project out of both ends of the bar-binding cylinder (10) with axes of the handle bars inclined to an axis of the bar-binding cylinder (10).

When the position of handle grip (5) is to be adjusted, the tightening means (8) is loosened so that the handle bar (1) and the pressure cylinder (2) may rotate in the bar-binding cylinder (10) independently, and only pressure cinder (2) is made to rotate. Since a slating direction of the through hole (20) is changed by rotation of the pressure cylinder (2), the projecting angle of the handle bar (1) inserted into the through hole (20) from the bar-binding cylinder (10) also may be changed. At the same time, a brake lever (12) must remain forward of the handle grip (5). After that, by tightening the tightening means (8), the pressure cylinder (2) and the handle bars (1,1) are fixed in the bar-binding cylinder (10) again. Namely, since the projecting direction of the handle bar (1) from the bar-binding cylinder (10) is changed, the position of the handle grip (5) also may be changed.

In the bicycle handle of this embodiment of the invention, the position of the handle grip (5) can be changed more easily, since an extra adjustment for the brake lever will not be necessary because the pressure cylinder (2) is made to rotate in the bar-binding cylinder (10). Since the projecting angle of the handle bar (1) from the bar-binding cylinder (10) can be changed, it is possible to change the positions of the handle grips (5,5) even if the handle bars are straight members as a whole.

A bicycle handle of the second invention comprises a bar-binding cylinder (10) provided on a handle stem, a pair of handle bars (1,1) arranged at both ends of the bar-binding cylinder (10), handle grips (5,5) provided on one end of each handle bar, and a pair of pressure cylinders (7,7), a through hole (70) being provided in each of the pressure cylinders (7,7). Through hole 70 consists of an inside hole, and an outside hole which slants from the inside hole. The diameter of the inside hole of the through hole (70) is a little larger than an outer diameter of the bar-binding cylinder (10). The diameter of the outside hole of the through hole (70) is a litter larger than the diameter of the insertion end of the handle bar (1). A slit (73) opens in a cylindrical wall of the pressure cylinder (7) along the axial direction, and bolts (75,751) are provided for tightening the pressure cylinder (7) by drawing toward each other side walls facing each other across the slit (73). The pressure cylinder (7) is fitted on both the end of the bar-binding cylinder (10) and the insertion end of the handle bar (1).

In the bicycle handle of the second invention, one end of the bar-binding cylinder (10) is inserted into the inside hole and the insertion end of one handle bar (1) is inserted into the outside hole of the through hole (70) of one pressure cylinder (7). The other end of the bar-binding cylinder (10) and the insertion end of the other handle bar (1) are inserted into the respective opposite ends of the through hole (70) of the other pressure cylinder (7) in the same way. Since the outside hole slants from the inside hole, the through hole (70) is not straight.

The side walls facing each other across the slit (73) are drawn toward each other by the bolts (75,751) so that an inner diameter of the pressure cylinder (7) becomes smaller. Thereby, the handle bar (1) is connected to the bar-binding cylinder (10) by a pressing force from the pressure cylinder (7).

When the position of handle grip (5) is changed after loosening the bolts (75, 751), only pressure cylinder (7) is made to rotate. Then, since the outside hole provided for the handle bar slants from the, inside hole provided for the bar-binding cylinder (10), by rotation of the pressure cylinder (7), the direction in which the outside hole for the handle bar slants is changed. Thus, the angle at which the handle bar (1) projects from the pressure cylinder (7) also is changed. At this time, the brake levers (12,12) must remain forward of the handle grips (5,5). After that, the bolts (75,751) are tightened again.

DETAILED DESCRIPTION OF THE PREFERRED EMBODIMENTS

Four embodiments will be explained with reference to the several figures of the accompanying drawings.

Embodiment 1

Figure 1:
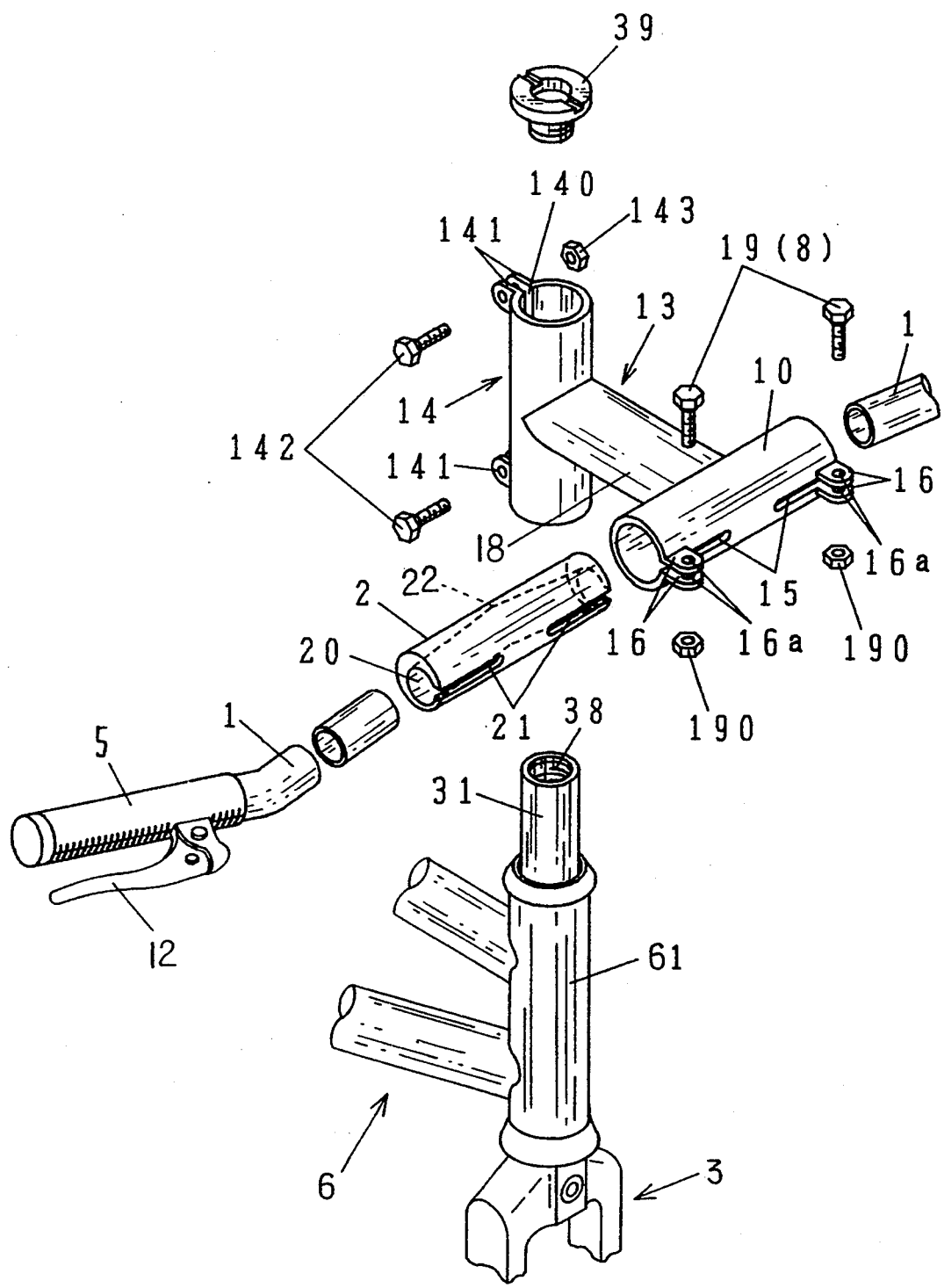
FIG. 1 is an exploded perspective view of a bicycle handle according to a first embodiment of the invention.
Figure 2:
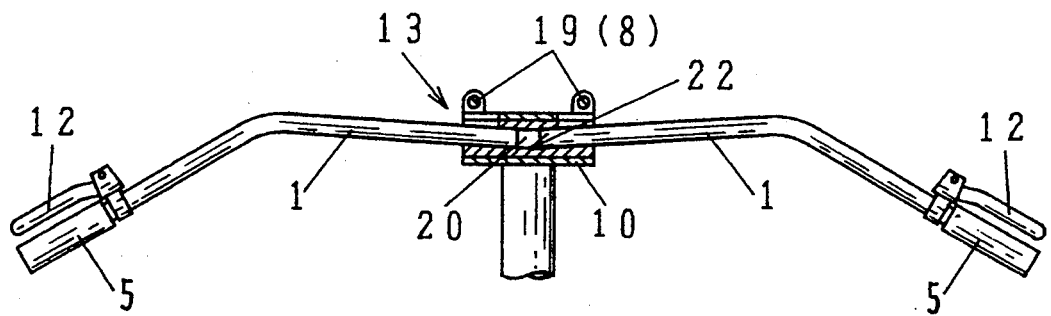
FIG. 2 is a partial cross-sectional plan view of a binding portion of the bicycle handle of the first embodiment.
Figure 3:
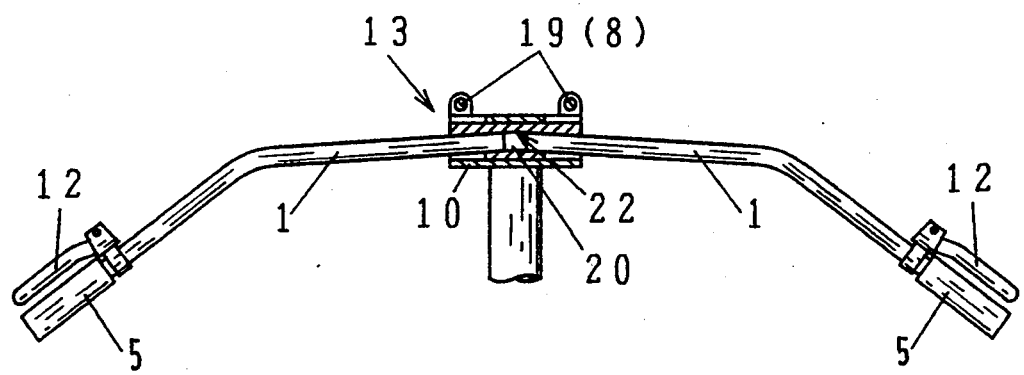
FIG. 3 is a partial horizontal cross-sectional view of the binding portion of the bicycle handle after adjusting the angle of the handle bars.

FIGS. 1-3 show a skeletal form of the construction of a bicycle handle according to the first embodiment.

In this first embodiment, a pressure cylinder (2) having a through hole (20) is inserted into a bar-binding cylinder (10). The through hole (20) is bent at the center of the pressure cylinder (2) symmetrically. The diameter of the through hole (20) is a little larger than the diameter of handle bar (1) and is able to become smaller by a pressing force of the bar-binding cylinder (10) in the radial direction.

A handle stem in the first embodiment, having a construction that is the same as that of a conventional bicycle handle, is fitted and fixed on a fork stem formed on a top of a fork blade of a front fork for a bicycle. As shown in FIG. 1, the fork stem (31) of the front fork (3) is inserted rotatably into a head tube (61) in a skeleton frame (6).

The handle stem (13) mounted on the fork stem (31) consists of a supporting cylinder (14) having a slit (140), bar-binding cylinder (10) having a pair of slits (15,15) and supporting two handle bars (1,1), and a connecting cylinder (18). The slit (140) is opened from end to end in the cylindrical wall of the supporting cylinder (14) along the axial direction. The slits (15,15) are opened at the respective opposite ends of the cylindrical wall of the bar-binding cylinder (10). The bar-binding cylinder (10) has horizontal tightening ears (16,16) which face each other across the slits (15,15). A vertical bolt bore (16a) is provided in each tightening ear (16).

The pressure cylinder (2), an outer diameter of which is a little smaller than an inner diameter of the bar-binding cylinder (10), is inserted into the bar-binding cylinder (10). The thickness of the cylindrical wall of the pressure cylinder (2) is nonuniform. The through hole (20) in the pressure cylinder (2) is bent at its midpoint symmetrically. In other words, the through hole (20) consists of two symmetric slanting holes. The diameter of the through hole (20) is a little larger than the diameter of the handle bar (1). A pair of slits (21,21) is provided in the cylindrical wall of the pressure cylinder (2). The slits open at respective opposite ends of the pressure cylinder (2), preferably in the thickest-walled portion or the thinnest-walled portion.

Next, the processes of assembling the bar-binding cylinder (10) and of adjusting the handle bars (1,1) will be explained.

The supporting cylinder (14) mounted to one end of the connecting cylinder (18) is fitted on the upper part of the fork stem (31) of the front fork (3). The supporting cylinder (14) has tightening ears (141,141) which face each other across the slits (140). The tightening ears (141,141) are tightened by bolts (142) and nuts (143). Thereby, the handle stem (13) is fixed on the fork stem (31) of the front fork (3). After that, a blank cap (39) is screwed in the thread (38) of an inner surface of the fork stem (31).

Then, after inserting the pressure cylinder (2) into the bar-binding cylinder (10), the insertion ends of the handle bars (1,1) are inserted into the respective ends of the through hole (20) of the pressure cylinder (2). In this condition, when the bolts (19,19) are inserted into the bolt bores (16a,16a), and the tightening ears (16,16) are tightened by bolts (19,19) and nuts (190,190), as the tightening means (8), the width of the slit (15) becomes narrow. Thus, the diameter of the bar-binding cylinder (10) becomes smaller and the outer surface of the pressure cylinder (2) is pressed by the inner surface of the bar-binding cylinder (10). As a result, the width of each slit (21) becomes narrow under a force to the pressure cylinder (2), and the diameter of the pressure cylinder (2) becomes smaller and the insertion ends of the respective handle bar (1) are pressed by the inner surface of the through hole (20) of the pressure cylinder (2). Accordingly, the handle bars (1,1) are fixed to the bar-binding cylinder (10) at a certain angle.

When we want to change angles of the handle bars (1,1) so that handle grips (5,5) may be drawn near a rider, after loosening the bolts (19,19), the handle bars (1,1) are extracted from the pressure cylinder (2), and the pressure cylinder (2) is made to rotate by an angle of 180 degrees so that a bending point (22) at the center of the through hole (20) points to the front of the bicycle, as shown in FIG. 3. The insertion ends of the handle bars (1,1) then are inserted into the opposite ends of the through hole (20) of the pressure cylinder (2) again. Since the direction in which the through hole (20) slants has been changed, the angle at which the handle bar (1) projects from the bar-binding cylinder (10) is also changed. The handle bars (1,1) must be maintained in their attitude so that the brake levers (12,12) are arranged forward of the handle grips (5,5). After that, the bar-binding cylinder (10) is tightened by the bolts (19,19) and the nuts (190,190) in the manner stated above. Thereby, the pressure cylinder (2) is fixed in the bar-binding cylinder (10). Since the projecting angle of the handle bars (1,1) can be changed in this manner, the positions of the handle grips (5,5) can also be changed, without an adjustment for the arrangement of the brake levers (12,12).

If the handle bars (1,1) and the pressure cylinder (2) are able to rotate relative to each other in the bar-binding cylinder (10), it may be unnecessary to extract the handle bars (1,1) from the pressure cylinder (2). Namely, when the pressure cylinder (2) alone is made to rotate clockwise or counterclockwise to a proper degree in the bar-binding cylinder (10), the handle bars (1,1) are not made to rotate together with the pressure cylinder (2). Thereby, it is possible to change the angles of the handle bars (1,1) by various amounts without an extra adjustment.

Embodiment 2

Figure 4:
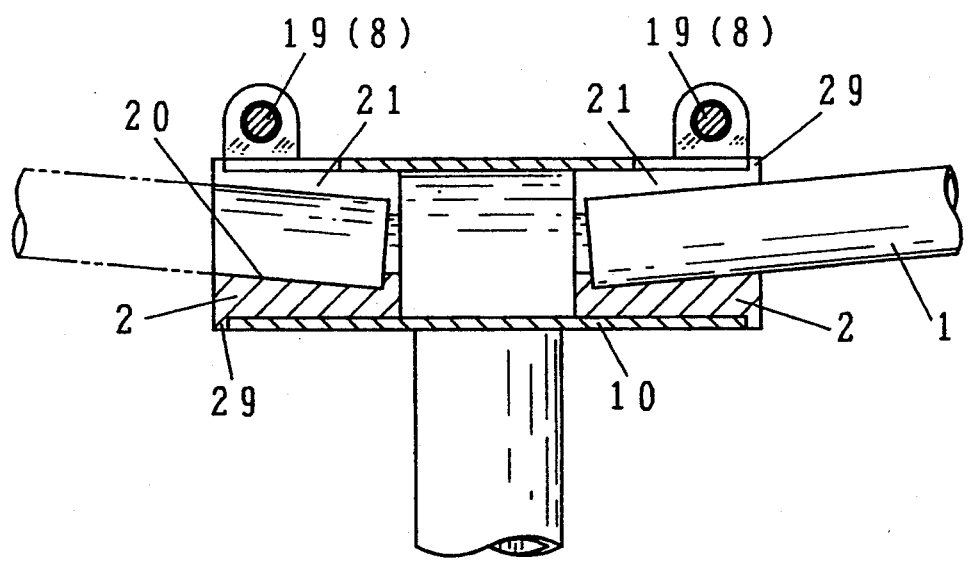
FIG. 4 is an enlarged detailed horizontal sectional view of a binding portion of a bicycle handle according to a second embodiment of the invention.
Figure 5:
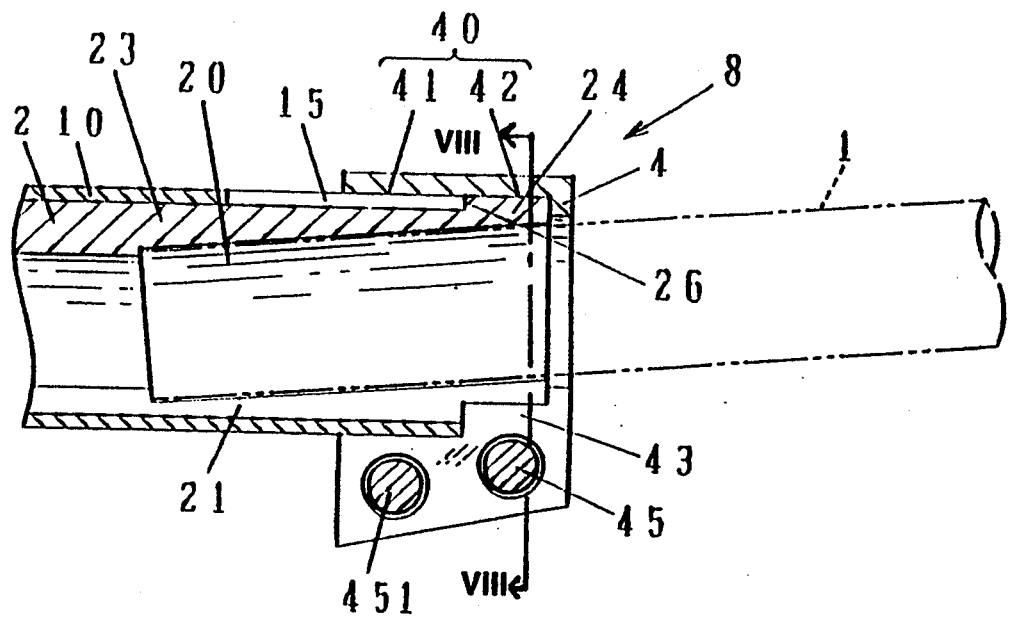
FIG. 5 is a partial enlarged detailed horizontal sectional view of a binding portion of a bicycle handle according to a third embodiment of the invention.
Figure 6:
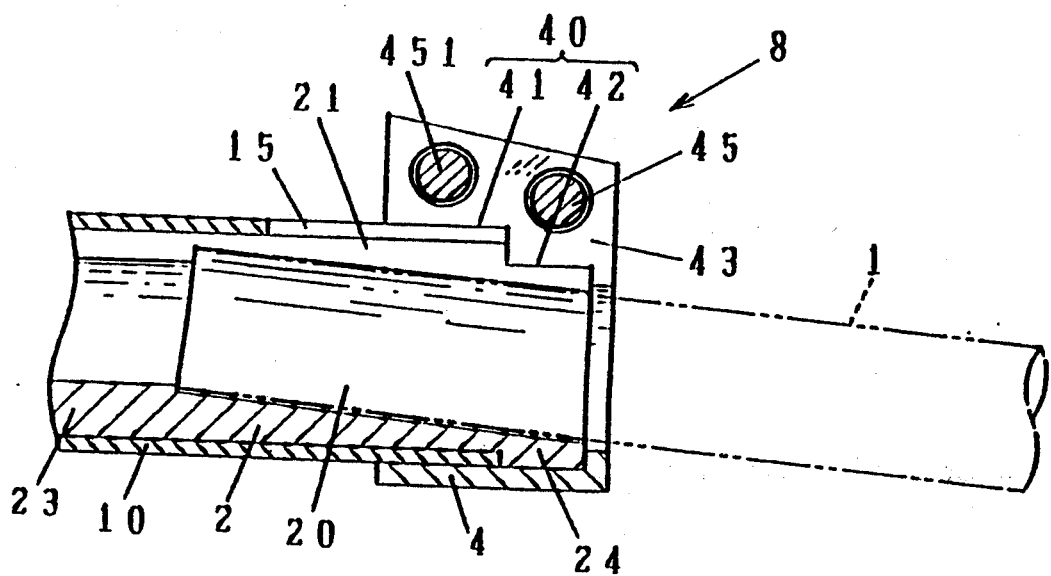
FIG. 6 is a partial enlarged detailed horizontal sectional view of the binding portion of the bicycle handle of the third embodiment after adjustment of an angle of a handle bar.
Figure 7:
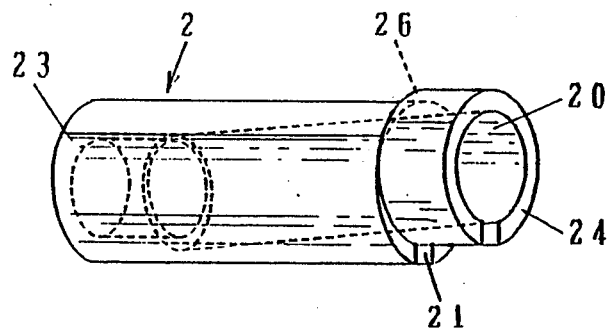
FIG. 7 is a perspective view of a pressure cylinder or the third embodiment of the invention.
Figure 8:
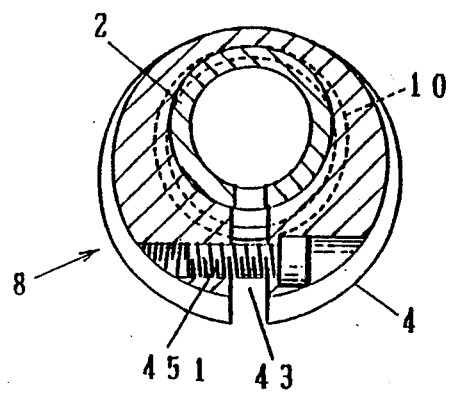
FIG. 8 is a sectional view of a clamping ring of the third embodiment.

Next, the second embodiment, as shown in FIG. 4, will be explained.

In this bicycle handle, the pressure cylinder is divided into two cylinders (2,2) having a slanting through hole (20). The pressure cylinders (2,2) are respectively inserted into the opposite ends of the bar-binding cylinder (10). A slit (21) is provided in the cylindrical wall of the pressure cylinder (2) along its axis from end to end. A flange (29), which collides with the end of the bar-binding cylinder (10), is formed throughout an entire periphery of the one end of the pressure cylinder (2), for positioning. In this bicycle handle, the divided pressure cylinders (2,2) are inserted into the respective ends of the bar-binding cylinder (10). An insertion end of each handle bar (1) is inserted into a respective end of the through hole (20) of the pressure cylinder (2). When the bolts (19,19) are tightened, the same forces are created as in the above-described first embodiment, so the handle bar (1) is fixed in the through hole (20).

Besides, since the divided pressure cylinders (2,2) are inserted into the ends of the bar-binding cylinder (10) only, it is possible to lighten the weight of the pressure cylinder in comparison with the non-divided pressure cylinder of the above-mentioned first embodiment.

Embodiment 3

FIG. 5 to FIG. 8 show another bicycle handle as the third embodiment. A pressure cylinder is divided into two pressure cylinders (2,2). Each pressure cylinder (2) consists of a first cylinder (23), and a second cylinder (24) which is eccentric to the first cylinder (23). A through hole (20), which slants from the axis of the cylinder, is provided in each of the pressure cylinders (2,2), as shown in the above-mentioned FIG. 4. A slit (21) is provided in the cylindrical wall of the pressure cylinder (2) along the axis, from end to end. The first cylinder (23) of the pressure cylinder (2) is inserted into a bar-binding cylinder (10). Clamping rings (4,4) as a tightening means (8) tighten both ends of the bar-binding cylinder (10) and the pressure cylinders (2,2) projecting out of the bar-binding cylinder (10). A tightening hole (40) in each clamping ring (4) consists of a small diameter hole (42) and a large diameter hole (41). An inner surface of the small diameter hole (42) presses against the outer surface of the pressure cylinder (2), and an inner surface of the large diameter hole (41) presses against the outer surface of the bar-binding cylinder (10). A slit (43) is provided in the wall of the clamping ring (4), from end to end. The two side walls facing each other across the slit (43) are tightened by bolts (45,451) which are hexagonal socket head cap bolts.

In this embodiment, when the pressure cylinders (2,2) are inserted into the respective ends of the bar-binding cylinder (10), a step (26) between the first cylinder (23) and the second cylinder (24) of each pressure cylinder (2) abuts with the end of the bar-binding cylinder (10). Therefore, tile first cylinders (23,23) alone are inserted into the respective opposite ends of the bar-binding cylinder (10), and the second cylinders (24,24) project out of the respective opposite ends of the bar-binding cylinder (10). The two clamping rings (4) are fitted on the respective ends of the bar-binding cylinder (10), and the respective second cylinders (24, 241) of the pressure cylinders (2,2), and then the handle bars (1,1) are inserted into the through holes (20) of the pressure cylinders (2,2). After that, the side walls of the slit (43) of each clamping ring (4) are drawn together by the bolts (45,451). Thus, the outer surfaces of the ends of the bar-binding cylinder (10) are pressed by the inner surface of the large diameter hole (41) of each of the clamping rings (4,4). And the outer surface of each second cylinder (24) is pressed by the inner surface of the small diameter hole (42) of the respective clamping ring (4). As a result, the handle bar (1) receives pressure from the inner surface of the pressure cylinder (2). Thereby, the handle bars (1,1) are fixed in the pressure cylinders (2,2).

When the bolts (45,451) are loosened, the pressure cylinders (2,2) can rotate in the bar-binding cylinder (10). At this time, the handle bars (1,1) cannot be made to rotate. After that, the bolts (45,451) are, tightened again. Since the direction in which the through hole (20) slants is changed by rotation of the pressure cylinder (2), the angle at which the handle bar (1) inserted into the through hole (20) projects, changes too. Since the handle bar (1) is not made to rotate, however, the brake levers (12,12) remain forward of the handle grips (5,5). Namely, the positions of the handle grips (5,5) can be changed to various positions without adjusting for the brake levers (12,12).

In the embodiment shown in FIG. 5 to FIG. 8, slits (15,15) in the cylindrical wall of the bar-binding cylinder (10) open toward the cylindrical wall ends. By the slits (15,15), the diameter of the bar-binding cylinder (10) can be compressed. So, in this embodiment, the inner surface of the bar-binding cylinder (10) presses intensively against the outer surface of each pressure, cylinder (2). However, the slits (15,15) do not always need opening.

Embodiment 4

Figure 9:
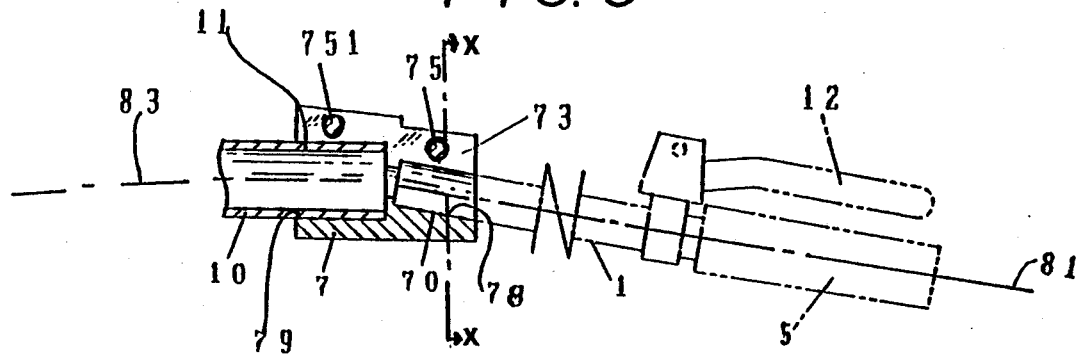
FIG. 9 is a partial enlarged detailed horizontal sectional view of a binding portion of a bicycle handle according to a fourth embodiment of the invention.
Figure 10:
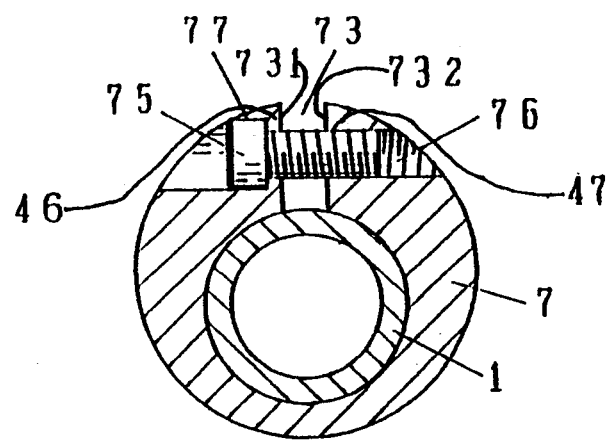
FIG. 10 is a sectional view of a pressure cylinder of the fourth embodiment.
Figure 11:
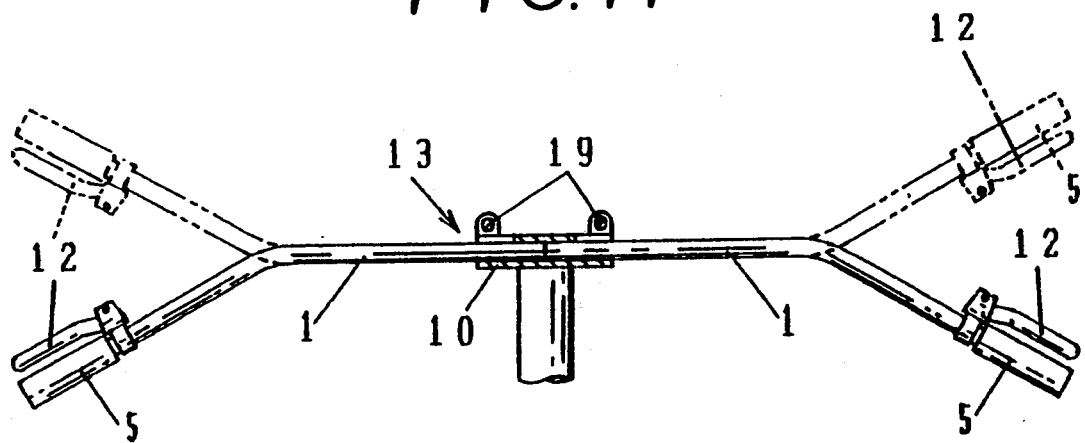
FIG. 11 is a partial sectional view of a conventional bicycle handle.

FIG. 9 and FIG. 10 show another bicycle handle according to a fourth embodiment of the invention.

A pressure cylinder is divided into two pressure cylinders (7,7). A slit (73) is provided in the wall of each pressure cylinder (7) so as to extend axially from end to end. Then, the pressure cylinder (7) is C-shaped in cross section. A through hole (70) in the pressure cylinder (7) consists of an inside hole (78), and an outside hole (79) having an axis (81) slanting from axis (83) of the inside hole. The diameter of the inside hole is a little larger than an outer diameter of a bar-binding cylinder (10), the bar-binding cylinder (10) being provided on a handle stem (13) (See FIG. 1 ). The diameter of the outside hole is a little larger than the diameter of handle bar (1). Two opposing side walls (46) and (47) of the pressure cylinder (7) have respective surfaces (731) and (732) which face each other across the slit (73). One of the side walls (46) has a threaded hole (76). The other side wall (47) has a through hole (77). A bolt (75) is inserted into the through hole (77) and is screwed into the threaded hole (76). Thus, by tightening the, bolt (75), the opposing surfaces (731) and (732) are urged toward each other so that the inner diameters of the pressure cylinder (7) become smaller.

As shown in FIG. 9, an end (11) of the bar-binding cylinder (10) is inserted into the inside hole, and the handle bar (1) is inserted into the outside hole of the through hole (70). Then the pressure cylinder (7) is tightened by the bolts (75,751) in the radial direction. Thus, the handle bar (1) and the bar-binding cylinder (10) are pressed and fixed in the pressure cylinder (7).

If the bolts (75,751) are loosened, each pressure cylinder (7) can be rotated on the bar-binding cylinder (10). So since a direction in which the outside hole of the through hole (70) slants is changed, an angle at which the handle bar (1) projects from the pressure cylinder (7) is changed. When the pressure cylinder (7) rotates on the bar-binding cylinder (10), the handle bar (1) is not made to rotate together with the pressure cylinder. After that, the bolts (75,751) are tightened again. Therefore, since the projecting angle of the handle bars (1,1) can be changed in the manner stated above, the positions of the handle grips (5,5) can be changed too.

What I claim is:

1. A bicycle handle comprising a horizontal bar-binding cylinder provided on a handle stem, a pair of handle bars inserted and fixed in both ends of the bar-binding cylinder, and a pair of pressure cylinders fit on both ends of the bar-binding cylinder, wherein a through hole perforated in each of the pressure cylinders consists of an inside hole and an outside hole which slants from an axis of the inside hole, the bar-binding cylinder is inserted into the inside hole rotatably, the handle bar is inserted into the outside hole rotatably, a slit is opened in a cylindrical wall of the pressure cylinder along with an axial direction from end to end, and side walls facing each other across the slit are tightened by bolts in a direction that said side walls approach each other.

2. A bicycle handle comprising:

a handle stem;

a horizontal bar-binding cylinder provided on said handle stem, said bar-binding cylinder having opposite first and second ends;

first and second pressure cylinders, a through hole in each of said first and second pressure cylinders, in each pressure cylinder said through hole including an inside hole and an outside hole, said outside, hole having an axis slanting relative to an axis of said inside hole, said first and second ends of said bar-binding cylinder rotatably mounted in the respective inside holes of said first and second pressure cylinders;

first and second handle bars rotatably mounted in the respective outside holes of said first and second pressure cylinders, each of said first and second pressure cylinders having a cylindrical wall, said cylindrical wall having a slit, said slit extending end-to-end in the directions of the axes of said inside and outside holes, surfaces of said cylindrical wall facing each other across the slit;

first urging means for urging the facing surfaces of said first pressure cylinder toward each other, so as to tighten a connection of said first pressure cylinder to said first handle bar and said first end of said bar-binding cylinder; and second urging means for urging the facing surfaces of said second pressure cylinder toward each other, so as to tighten a connection of said second pressure cylinder to said second handle bar and said second end of said bar-binding cylinder.

3. A bicycle handle as claimed in claim 2, wherein said first urging means comprises at least one first bolt connecting portions of said first pressure cylinder on opposite sides of the slit of said first pressure cylinder, and said second urging means comprises at least one second bolt connecting portions of said second pressure cylinder on opposite sides of the slit of said second pressure cylinder.

4. A bicycle handle, comprising:

a handle stem;

a horizontal bar-binding cylinder provided on said handle stem, said bar-binding cylinder having opposite first and second ends;

first and second pressure cylinders, each having a through hole, a slit and surfaces facing each other across the slit, in each pressure cylinder said through hole and said slit each extending from end to end of the pressure cylinder, said through hole including an inside hole and an outside hole, said outside hole having an axis slanting relative to an axis of said inside hole, said first and second ends of the bar-binding cylinder rotatably mounted in the respective inside holes of said first and second pressure cylinders;

first and second handle bars rotatably mounted in the respective outside holes of said first and second pressure cylinders;

first urging means for urging the facing surfaces of said first pressure cylinder toward each other so as to tighten a connection of said first pressure cylinder to said first handle bar and said first end of said bar-binding cylinder; and second urging means for urging the facing surfaces of said second pressure cylinder toward each other so as to tighten a connection of said second pressure cylinder to said second handle bar and said second end of said bar-binding cylinder.

5. A bicycle handle as claimed in claim 4, wherein said first urging means comprises at least one first bolt connecting portions of said first pressure cylinder on opposite sides of the slit of said first pressure cylinder, and said second urging means comprises at least one second bolt connecting portions of said second pressure cylinder on opposite sides of the slit of said second pressure cylinder.

* * * * *